Patented Aug. 19, 1947

2,425,756

UNITED STATES PATENT OFFICE 2,425,756

METHOD OF MAKING VARNISHES FROM POLYHYDRIC ALCOHOL MIXED ESTERS OF β-FURYLACRYLIC ACID AND AN ACIDIC NATURAL RESIN

Henry S. Rothrock, Wilmington, Del., assignor to E. I. du Pont de Nemours & Company, Wilmington, Del., a corporation of Delaware No Drawing. Application August 6, 1946, Serial No. 688,701

7 Claims. (Cl. 260—23)

This invention relates to the art of coating compositions, and more particularly to a method of making rapidly drying varnishes.

Of the natural drying oils, China-wood oil, Perilla oil, and oiticica oil are outstanding in their ability to form hard, tack-free, water-resistant films when properly formulated into varnish and enamel compositions. Unfortunately, however, these oils are not produced in this country in substantial quantities, and by reason of the war their importation is practically impossible. Further difficulties with these oils are that they are subject to wide fluctuations in price and quality. Also, as is well known, some of these oils have a tendency to form films that "crystallize" or "frost." This application is a continuation-in-part of my copending application Serial Number 498,095, filed August 10, 1943.

This invention has as its general objective the preparation of new varnishes which are not dependent upon the use of the rapidly drying natural fatty oils which have heretofore been used.

Another objective is the preparation of varnishes having improved film-forming properties, especially drying rates, hardness, and toughness, of about the same order as, or better than, those based on the natural drying oils.

A further objective is the preparation of improved varnishes which do not exhibit the undesirable "frosting" which is characteristic of many China-wood oil varnishes, and yet which show the rapid-drying properties of China-wood oil varnishes.

A still further objective is the provision of a new and improved method of preparing varnishes through the use of a β-furylacrylic acid.

The above and other objects appearing hereinafter are accomplished by a process consisting essentially of partially esterifying a polyhydric alcohol with a β-furylacrylic acid or an esterifiable derivative thereof, heating the partial ester successively with an acidic natural resin and a natural fatty oil under esterifying conditions, and adding varnish solvent.

The expression "a β-furylacrylic acid" is used in a generic sense to include not only the specific compound β-(2-furyl)acrylic acid, but also those acids (wherein the furane ring is attached, preferably at the 2-position, to the β carbon of the acrylic acid radical) having a substituent on the α carbon, or another substituent on the β carbon, or one or more substituents in the furane ring, or any combination of these. The presence or absence of such substituents does not change the particular sequence of the double bonds, involving the furane ring, which is considered to be the critical element of structure.

In the preferred practice of the invention, glycerol is partially esterified with a β-furylacrylic acid to give a diglyceride, and this diglyceride is further esterified with rosin. The resultant mixed glyceride is then cooked with a drying oil, such as linseed oil, and thinned with varnish solvent to the desired viscosity. The mixed glyceride is of unique value in making varnishes. Valuable properties contributed to these varnishes by the mixed glyceride are due to the presence of the β-furylacrylic acid radical. For example, unlike most varnish resins, the mixed glyceride can be mixed with the drying oil at the start of the varnish cook without substantially reducing the bodying rate of the oil, and, in fact, with the slower bodying oils, such as soya oil and linseed oil, actually increases the rate of bodying. The mixed glyceride can also be used in the usual manner, of course, as a checking gum, and, in view of its solid nature, is readily handled in the customary manner as a varnish resin.

The more detailed practice of the invention is illustrated in the following examples, wherein the amounts of the ingredients are by weight, such examples being given by way of illustration and not as a limitation. In these examples, colors are given on the Gardner-Holdt scale, viscosities are given in poises except where otherwise stated, and the hydroxyl numbers are all corrected for acidity. Drier concentrations refer to per cent metal (used as a soluble salt) based on the oil present. The term "mineral spirits" refers to aliphatic hydrocarbon fractions boiling in the range of 150–200° C., and the term "high-flash naphtha" refers to aromatic-type hydrocarbons boiling in the range of 150–200° C.

The compositions of the mixed esters in the following examples are an index to the proportion of β-furylacrylic acid radicals in the product; i. e., they do not mean the product actually contains the stated percentages of, for example, the compounds glyceryl trirosinate, or glyceryl tri-(β-furyl)acrylate. To illustrate, a product referred to as having 45.4% β-furylacrylic acid glyceride and 54.6% rosin glyceride is a product prepared from proportions of reactants so chosen as to yield a mixture of the two mentioned glycerides in the stated proportions by weight, theoretically, i. e., if it be assumed no mixed esters are formed. Actually such a product is considered to be composed principally of mixed glycerides, probably mixtures of mixed glycerides, although small amounts of simple glycerides, partial glycerides (i. e., glycerol incompletely esterified), free glycerol and free acids are undoubtedly present.

*Example 1*

This illustrates the preparation of a varnish by making a mixed glyceride of β-(2-furyl)acrylic acid and rosin corresponding to the composition 45.4% β-(2-furyl)acrylic glyceride and 54.6% rosin glyceride, and then heating the mixed glyceride with linseed oil.

Freshly distilled methyl β-(2-furyl)acrylate, 2670 parts, and 848 parts of dynamite grade glycerol, with 2.7 parts of litharge as catalyst, are held at 180–200° C. with stirring for 6 hours under a blanket of inert gas, the methanol evolved being removed continuously through a short open column connected to a take-off condenser head. A moderate inert gas blow is maintained during the final 3 hours to facilitate removal of the methanol, and thus assist in forcing the reaction to completion. The resultant β-(2-furyl)acrylic diglyceride is a dark oil with a viscosity of 20–30 poises at 50° C. and a hydroxyl number of about 220, indicating approximately 90% reaction completion.

The above diglyceride, 800 parts, is heated to 200° C. in 15 minutes in an atmosphere of inert gas and 818 parts of varnish grade rosin added with stirring. The temperature is then raised to 235° C. in 45 minutes and held at 230–240° C. for 3 hours, using a fairly heavy inert gas blow to facilitate removal of the water formed. On cooling, the resultant mixed glyceride of β-(2-furyl)-acrylic acid and rosin (essentially abietic acid) is obtained as a hard, brittle solid which softens at about 88° C. and is dispersible in unbodied linseed oil at about 200° C.

Alkali-refined linseed oil, 492 parts, is heated to 305° C. in about 30 minutes and 110 parts of the above mixed β-(2-furyl)acrylic/rosin glyceride is added with stirring, during which operation the temperature drops to about 275° C. The temperature is then raised to 305° C. and held at 300–305° C. for about 1 hour and 40 minutes to the formation of a very heavy hot string. At this point, 81.5 parts of a phenol-formaldehyde modified ester gum (known to the trade as "Amberol 925") is added, the temperature falling during this operation to about 270° C., at which temperature it is maintained for about 15 minutes. Litharge, 6.8 parts, slurried in 5 parts of linseed oil, is then worked into the varnish with stirring. The temperature is maintained at 270° C. for about 17 minutes longer and then allowed to fall to 200° C., at which temperature the varnish is thinned to 52% solids content with mineral spirits. The resulting varnish has a color of 9 and a viscosity of 2.5 poises. It dries tack-free in 8 to 9 hours with 0.02% added manganese as drier, giving very hard and print-resistant films after overnight drying. It is particularly well adapted for use as a clear spar varnish or as a vehicle for durable enamel finishes.

*Example 2*

This illustrates the preparation of a varnish from β-(2-furyl)acrylic diglyceride, rosin, and linseed oil by a special procedure permitting the preparation of a very short oil varnish having an unusually high content of β-(2-furyl)acrylic glyceride.

β-(2-furyl)acrylic diglyceride, 800 parts, prepared as in Example 1, is heated to 200° C. in 15 minutes in an atmosphere of inert gas, and 818 parts of rosin acids added with stirring. The temperature is then raised to 235° C. in 45 minutes and held at 230–240° C. for 3 hours, using a fairly heavy inert gas blow to facilitate removal of the water formed. On cooling, the resultant mixed glyceride is a hard, brittle solid which softens at about 88° C.

Alkali-refined linseed oil, 30 parts, is heated to 300° C. under an inert gas atmosphere and 170 parts of the above mixed glyceride is added with stirring, during which operation the temperature drops to about 200° C. The temperature is then raised to 270° C. in 20 minutes, and maintained at 270–275° C. for 15 minutes. The product is cooled to 200° C. and thinned with high-flash naphtha to a total solids content of 60%. The resulting varnish has a color of about 10 and a viscosity of 1.25 poises. With 0.05% cobalt as drier, this varnish dries tack-free in about 1 hour, giving a very hard but fairly brittle film. Much better flexibility is obtained by baking at 200° C. for 20 minutes, which gives films showing excellent adhesion to metals, high resistance to strong solvents, and good chemical inertness. Such baked films are particularly useful as coatings for metal shell casings for ammunition and as coatings for the inside of foodstuff containers.

*Example 3*

This illustrates the preparation of a mixed glyceride of β-(2-furyl)acrylic acid and rosin of 17.5% β-(2-furyl)acrylic glyceride content, and the combination of this mixed glyceride with linseed oil to form a varnish.

Methyl β-(2-furyl)acrylate, 215 parts, and 155 parts of dynamite grade glycerol are heated under an inert atmosphere at 190–200° C. with stirring for 2 hours, the methanol evolved being removed continuously through a short open column connected to a take-off condenser head. A moderate inert gas blow is maintained during the final hour to facilitate removal of the methanol, and thus assist in forcing the reaction to completion.

The resulting partial glyceride, 106 parts, is heated to 255° C. under a blanket of carbon dioxide gas, and 176 parts of rosin is added. The temperature is held at 250–260° C. for 30 minutes and then 176 parts of additional rosin is added, after which the temperature is maintained at 260–270° C. for about 50 minutes. On cooling, the product (a mixed glyceride of β-(2-furyl)-acrylic acid and rosin) is a hard, brittle solid softening at 85–90° C. It is dispersible in unbodied linseed oil at about 100° C.

Alkali-refined linseed oil, 104 parts, is heated under a blanket of carbon dioxide to 305° C., and then 26 parts of the above mixed glyceride is added. Heating is continued at 290–310° C. to the formation of a 3-foot cold string. The batch is then cooled and thinned to 60% solids content with mineral spirits. The resulting varnish has a viscosity of 2.5 poises. With 1% lead and 0.15% manganese as driers, it dries to tack-free films in about 12 hours and shows good hardness after overnight drying.

In the foregoing examples, the methyl ester of the β-furylacrylic acid was used to make the partial ester of the polyhydric alcohol, using litharge as the ester interchange catalyst. Other ester interchange catalysts which can be used are sodium hydroxide and sodium glycerolate. β-furylacrylic acid itself, or any of its esterifiable derivatives, can be used in making the partial ester. Examples of esterifiable derivatives are the anhydride, acid chloride, and esters with monohydric alcohols. The reaction temperature used will, of course, depend upon the reactant and catalyst used, but will generally be between 100 and 250° C.

The reaction of the rosin with the partial glyceride of the β-furylacrylic acid to give the mixed glyceride is carried out at esterifying temperatures, preferably in the range between 190 and 260° C. The further heating of the product with drying oil is generally effected in the range between 250 and 310° C., but somewhat lower temperatures are preferred when fast drying oils, such as China-wood, are used.

Although the mixed polyhydric alcohol esters in the foregoing examples are prepared from β-(2-furyl)acrylic acids, it is, of course, understood that the mixed esters can be prepared from other β-furylacrylic acids or their esterifiable derivatives, provided said derivatives contain only those additional groups which are not reactive with the esterifiable groups contained in the reaction mixture. Suitable derivatives are the acid, the acid chloride, the acid anhydride, and esters with monohydric alcohols which are free of additional groups that are reactive with esterifiable groups contained in the reaction mixture. Specific examples of other β-furylacrylic acids whose mixed esters may be used are:

α-β-di-(2-furyl)acrylic acid,
α-methyl-β-(2-furyl)acrylic acid,
α-phenyl-β-(2-furyl)acrylic acid,
α,β-dimethyl-β-(2-furyl)acrylic acid,
β-cyclohexyl-β-(2-furyl)acrylic acid,
β-(3-furyl)acrylic acid,
α-cyano-β-(2-furyl)acrylic acid,
β-[2-(5-chlorofuryl)]acrylic acid, and
β-[2-(5-methylfuryl)]acrylic acid.

Other polyhydric alcohols which can be used to prepare the mixed esters include diethylene glycol, hexamethylene glycol, decamethylene glycol, cyclohexyl-1,2-dicarbinol, methyltrimethylolmethane, erythritol, sorbitol, and p,p'-di(2-hydroxyethyl)benzene. Best results are obtained with alcohols having more than two hydroxyl groups.

It is to be understood that resin acids and acidic resins other than rosin can be used to prepare the mixed polyhydric alcohol esters. As additional examples may be mentioned copals, for example, the Manila copals, Melengket, Loba, Pontianack, Boea, and the Congo and kauri copals. Additional examples are sandarac and accroider, as well as those natural resins of lower acid number, such as the dammars and the East Indias.

Mixtures of the essentially neutral natural resins can be used in conjunction with the more acidic materials provided there is sufficient acidic component to balance approximately the free hydroxyls provided by the partial polyhydric alcohol ester of the β-furylacrylic acid being used. Other acidic materials can be used in conjunction with the natural resin acids. For example, the inclusion of about 5% of maleic anhydride, particularly when preheated with the partial polyhydric alcohol ester of the β-furylacrylic acid before reaction with the natural resin acid, has been found to give a marked improvement in the color of the resulting mixed glycerides.

Although the ratios of β-furylacrylic acid component to natural resin in the mixed glycerides can be varied over a wide range, the most practical compositions are those corresponding to 5–50% β-furylacrylic glyceride and 95–50% resin acid glyceride. The ratio of mixed glyceride to natural drying oil will generally be between 1:6 and 6:1.

The preferred drying oil with which to cook the mixed β-furylacrylic acid/resin acid glyceride in the preparation of the varnishes of this invention is linseed oil. However, other drying oils can be used, e. g., soya, China-wood, oiticica, perilla, cottonseed, dehydrated cocoanut, rapeseed and sunflower oils.

Varnishes prepared by the process of this invention can be blended with a wide variety of film-forming materials and other modifying agents. Thus they can be blended with polyvinyl, polyacrylate, and polymethacrylate resins; amide-formaldehyde, aldehyde- and ketone-formaldehyde, amine-formaldehyde, phenol-formaldehyde, and hydrogenated phenol-formaldehyde resins; hydrogenated rosin, ester gum, phenolic extended ester gum; natural resins and shellac; coal tar and petroleum resins; chlorinated rubber and other modified rubber resins; divinylacetylene resins; dicyandiamide resins, and the like. They can also be modified by further blending with natural and synthetic drying oils.

In certain compositions, it may be found advantageous to incorporate waxes, such as carnauba wax, beeswax, paraffin wax, and the like. The waxes increase the mar resistance of coatings prepared from the varnishes. There may also be included cellulose derivatives, such as nitrocellulose and ethyl cellulose. The cellulose derivatives accelerate the set-up of the varnish. It is sometimes advisable to add anti-skinning, anti-settling, or anti-gelling agents, such as pine oil, hydroquinone, guaiacol, lower aliphatic oximes, and 1,3-diketones.

When desired, driers may be cooked into the composition during preparation; however, when excellence of color is required, it is advisable merely to add solutions of metallic drier salts to the finished composition, especially when lead is employed as the drier. It should also be pointed out that long heating cycles and high temperatures should be avoided where color is of prime importance. A further precaution advised in connection with obtaining excellence of color is to avoid the cooking-in of large proportions of alkaline materials, such as lime. In this connection, it is also of advantage to use only those pigments which are acidic or neutral, and to avoid the use of strongly alkaline pigments, such as zinc oxide, in the formulation of enamels.

Metallic aluminum can be added to the varnishes of this invention. These aluminum containing compositions show excellent leafing retention, fast drying properties, good hardness, and freedom from tack.

Varnishes made by the process of this invention are particularly adapted to the coating of wood and metal surfaces. Other uses are as coating and/or impregnating agents for leather, paper, and other fibrous materials.

It is apparent that many widely different embodiments of this invention may be made without departing from the spirit and scope thereof; and, therefore, it is not intended to be limited except as indicated in the appended claims.

I claim:

1. A method of making a varnish which comprises partially esterifying a polyhydric alcohol with an esterifiable β-furylacrylic acid compound, of the class which consists of the acid, the acid chloride, the acid anhydride, and esters with monohydric alcohols which are free of additional groups that are reactive with esterifiable groups contained in the reaction mixture, further esterifying the polyhydric alcohol with an acidic natural resin, heating the mixed ester with a natural fatty oil, and adding a varnish solvent.

2. A method of making a varnish which comprises partially esterifying glycerol with an esterifiable β-(2-furyl)acrylic acid compound, of the class which consists of the acid, the acid chloride, the acid anhydride, and esters with monohydric alcohols which are free of additional groups that are reactive with esterifiable groups contained in the reaction mixture, further esterifying the glycerol with rosin, heating the mixed glyceride with linseed oil, and adding a varnish solvent and a drier.

3. A method of making a varnish which comprises esterifying glycerol with a sufficient amount of a β-(2-furyl)acrylic acid compound, of the class which consists of the acid, the acid chloride, the acid anhydride, and esters with monohydric alcohols which are free of additional groups that are reactive with esterifiable groups contained in the reaction mixture, to give a diglyceride, further esterifying the diglyceride with rosin, cooling the mixed glyceride, blending it with hot bodied linseed oil, and adding varnish solvent and drier.

4. The method of making a varnish which comprises forming a solid mixed ester of a polyhydric alcohol by successive esterification with an esterifiable β-furylacrylic acid compound, of the class which consists of the acid, the acid chloride, the acid anhydride, and esters with monohydric alcohols which are free of additional groups that are reactive with esterifiable groups contained in the reaction mixture, and an acidic natural resin, blending this by heat treatment with a natural fatty oil and then adding varnish solvent and drier.

5. The method of making a varnish which comprises forming a solid mixed ester of glycerol by successive esterification with an esterifiable β-(2-furyl)acrylic acid compound, of the class which consists of the acid, the acid chloride, the acid anhydride, and esters with monohydric alcohols which are free of additional groups that are reactive with esterifiable groups contained in the reaction mixture, and rosin, blending this by heat treatment with linseed oil and then adding varnish solvent and drier.

6. The method of making a varnish which comprises heating a partial ester of a polyhydric alcohol and β-furylacrylic acid with an acidic natural resin to esterify them, blending the resulting product by heat treatment with a natural fatty oil, and then adding varnish solvent and drier.

7. The method of making a varnish which comprises heating a partial ester of glycerol and β-(2-furyl)acrylic acid with rosin to esterify them, blending the resulting product by heat treatment with linseed oil, and then adding varnish solvent and drier.

HENRY S. ROTHROCK.